(12) United States Patent
DelDuca et al.

(10) Patent No.: US 6,508,955 B1
(45) Date of Patent: *Jan. 21, 2003

(54) OXYGEN SCAVENGER ACCELERATOR

(75) Inventors: Gary R. DelDuca, Canadaigua, NY (US); Alan E. Deyo, Rushville, NY (US); Vinod K. Luthra, Pittsford, NY (US); Wen P. Wu, Pittsford, NY (US)

(73) Assignee: Pactiv Corporation, Lake Forest, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/439,615

(22) Filed: Nov. 12, 1999

Related U.S. Application Data

(63) Continuation of application No. 08/856,448, filed on May 14, 1997, now Pat. No. 5,928,560, which is a continuation of application No. 08/700,644, filed on Aug. 8, 1996, now abandoned

(60) Provisional application No. 60/108,315, filed on Nov. 13, 1998.

(51) Int. Cl.[7] ........................ C01B 3/00; C09K 15/32; A21D 10/02; B65D 81/26
(52) U.S. Cl. .................. 252/188.28; 252/400.1; 426/126; 206/204
(58) Field of Search ................ 252/188.28, 400.1; 426/126; 206/204

(56) References Cited

U.S. PATENT DOCUMENTS

| | | | |
|---|---|---|---|
| 1,475,396 A | 11/1923 | Kestner | 422/19 |
| 1,679,543 A | 8/1928 | Rector | 99/181 |
| 2,825,651 A | 3/1958 | Loo et al. | 99/171 |
| 3,363,395 A | 1/1968 | King | 53/112 |

(List continued on next page.)

FOREIGN PATENT DOCUMENTS

| | | |
|---|---|---|
| EP | 0 468 880 | 1/1992 |
| EP | 92/4298 | 6/1992 |
| EP | 0 547 761 | 6/1993 |
| GB | 1556853 | 11/1979 |
| GB | 1 556 853 | 11/1979 |
| JP | 06278774 | 10/1994 |
| JP | 06278774 | 12/1994 |
| WO | WO 98/06281 | 2/1998 |

OTHER PUBLICATIONS

US 6,103,281, 8/2000, DelDuca et al. (withdrawn)
Fran Labell, "Controlled & Modified Atmosphere Packating—Methods for Extending Shelf Life of a Variety of Food Products," *Food Processing*, (Jan., 1995), 125–54.
Patent Abstracts of Japan 03202150 (1991).
Multiform Disiccants Inc. Product brochure, (1994).
*Principles of Modified–Atmosphere and Sous Vide Product Packaging*; J. Barber and K. Dodds, Ed. "Modified Atmosphere Packaging–Present and Future Uses of Gas Absorbents and Generators", by J. Smith et al., pp. 287–297 (1995).
Conference Publication *Modified Atmosphere Packaging (MPAP) and Related TEchnologies*. Chipping Camden, UK. Presentation–"Active Packaging with Oxygen Absorbers in the Food Industry", by Jonathan Hurst., Sep. 6–7, 1995.

(List continued on next page.)

*Primary Examiner*—Joseph D. Anthony
(74) *Attorney, Agent, or Firm*—Jenkens & Gilchrist

(57) ABSTRACT

An oxygen scavenging packet containing an iron-based oxygen scavenger and an electrolyte is set forth in which the rate of uptake of oxygen is increased by virtue of the introduction into the packet of an oxygen uptake accelerator containing water. Methods of increasing the rate of oxygen absorption by use of the iron-based oxygen scavenging packet are also set forth.

13 Claims, 7 Drawing Sheets

U.S. PATENT DOCUMENTS

| | | | | |
|---|---|---|---|---|
| 3,419,400 | A | 12/1968 | Hayhurst et al. | 99/171 |
| 3,467,244 | A | 9/1969 | Mahaffy et al. | 206/45.34 |
| 3,481,100 | A | 12/1969 | Bergstrom | 53/22 |
| 3,545,163 | A | 12/1970 | Mahaffy et al. | 53/22 |
| 3,574,642 | A | 4/1971 | Weinke | 99/174 |
| 3,634,993 | A | 1/1972 | Pasco et al. | 53/22 |
| 3,650,775 | A | 3/1972 | Simon et al. | 99/174 |
| 3,679,093 | A | 7/1972 | Chang | 220/90.2 |
| 3,686,822 | A | 8/1972 | Wolfelsperger | 53/22 |
| 3,750,362 | A | 8/1973 | Kishpaugh et al. | 53/22 |
| 3,788,369 | A | 1/1974 | Killinger | 141/114 |
| 3,792,181 | A | 2/1974 | Mahaffy et al. | 426/123 |
| 3,843,806 | A | 10/1974 | Kishpaugh et al. | 426/106 |
| 3,851,441 | A | 12/1974 | Marchang | 53/116 |
| 3,903,309 | A | 9/1975 | Mahaffy et al. | 426/129 |
| 4,083,372 | A | 4/1978 | Boden | 131/8 |
| 4,127,503 | A | 11/1978 | Yoshikawa et al. | 252/429 |
| 4,166,807 | A | 9/1979 | Komatsu et al. | 252/439 |
| 4,192,773 | A | 3/1980 | Yoshikawa et al. | 252/429 |
| 4,201,030 | A | 5/1980 | Mahaffy et al. | 53/432 |
| 4,230,595 | A | 10/1980 | Yamaji et al. | 252/188 |
| 4,242,659 | A | 12/1980 | Baxter et al. | 338/28 |
| 4,299,719 | A | 11/1981 | Aoki et al. | 252/188 |
| 4,308,711 | A | 1/1982 | Mahaffy et al. | 53/511 |
| 4,317,742 | A | 3/1982 | Yamaji et al. | 252/188 |
| 4,337,276 | A | 6/1982 | Nakamura et al. | 426/124 |
| 4,340,138 | A | 7/1982 | Bernherdt | 206/216 |
| 4,349,999 | A | 9/1982 | Mahaffy et al. | 53/128 |
| 4,366,179 | A | 12/1982 | Nawata et al. | 426/395 |
| 4,379,453 | A | 4/1983 | Baron | 604/145 |
| 4,384,972 | A | 5/1983 | Nakamura | 252/188.21 |
| 4,406,813 | A | 9/1983 | Fujishima et al. | 252/188.28 |
| 4,411,122 | A | 10/1983 | Cornish et al. | 53/436 |
| 4,411,918 | A | 10/1983 | Cimino et al. | 426/124 |
| 4,424,659 | A | 1/1984 | Perigo et al. | 53/425 |
| 4,454,945 | A | 6/1984 | Jabarin et al. | 206/524.3 |
| 4,510,162 | A | 4/1985 | Nezat | 426/124 |
| 4,517,206 | A | 5/1985 | Murphy et al. | 426/115 |
| 4,524,015 | A | 6/1985 | Takahashi et al. | 252/188.28 |
| 4,536,409 | A | 8/1985 | Farrell et al. | 426/398 |
| 4,543,770 | A | 10/1985 | Walter et al. | 53/511 |
| 4,564,054 | A | 1/1986 | Gustavsson | 141/329 |
| 4,574,174 | A | 3/1986 | McGonigle | 219/10.55 |
| 4,579,223 | A | 4/1986 | Otsuka et al. | 206/204 |
| 4,581,764 | A | 4/1986 | Plock et al. | 383/101 |
| 4,588,561 | A | 5/1986 | Aswell et al. | |
| 4,622,229 | A | 11/1986 | Toshitsugu | 426/395 |
| 4,622,239 | A | 11/1986 | Schoenthaler et al. | 427/96 |
| 4,642,239 | A | 2/1987 | Ferrar et al. | 426/396 |
| 4,645,073 | A | 2/1987 | Homan | 206/219 |
| 4,657,610 | A | 4/1987 | Komatsu et al. | 156/87 |
| 4,683,139 | A | 7/1987 | Cheng | 426/265 |
| 4,683,702 | A | 8/1987 | Vis | 53/433 |
| 4,711,741 | A | * 12/1987 | Fujishima et al. | 252/188.28 |
| 4,737,389 | A | * 4/1988 | Hartsing, Jr. et al. | 428/35 |
| 4,740,402 | A | * 4/1988 | Maeda et al. | 428/35 |
| 4,756,436 | A | * 7/1988 | Morita et al. | 215/228 |
| 4,762,722 | A | 8/1988 | Izumimoto et al. | |
| 4,769,175 | A | * 9/1988 | Inoue | 252/188.28 |
| 4,820,442 | A | * 4/1989 | Motoyama et al. | 252/188.28 |
| 4,830,855 | A | * 5/1989 | Stewart | 424/448 |
| 4,830,863 | A | * 5/1989 | Jones et al. | 426/118 |
| 4,836,952 | A | * 5/1989 | Nasu et al. | 252/188.28 |
| 4,840,271 | A | * 6/1989 | Garwood | 206/213.1 |
| 4,842,875 | A | * 6/1989 | Anderson | 426/118 |
| 4,876,146 | A | * 10/1989 | Isaka et al. | 428/347 |
| 4,877,664 | A | * 10/1989 | Maeda et al. | 428/35.9 |
| 4,897,274 | A | * 1/1990 | Candida et al. | 426/127 |
| 4,908,151 | A | * 3/1990 | Inoue et al. | 252/188.28 |
| 4,910,032 | A | * 3/1990 | Antoon, Jr. | 426/118 |
| 4,923,703 | A | * 5/1990 | Antoon, Jr. | 426/118 |
| 4,928,474 | A | * 5/1990 | Schirmer | 53/425 |
| 4,942,048 | A | * 7/1990 | Nasu et al. | 426/271 |
| 4,943,440 | A | * 7/1990 | Armstrong | 426/118 |
| 4,949,847 | A | * 8/1990 | Nagata | 206/484.1 |
| 4,952,451 | A | * 8/1990 | Mueller | 428/218 |
| 4,956,209 | A | * 9/1990 | Isaka et al. | 428/35.2 |
| 4,992,410 | A | * 2/1991 | Cullen et al. | 502/407 |
| 4,996,068 | A | * 2/1991 | Hatakeyama et al. | 426/234 |
| 5,019,212 | A | * 5/1991 | Morita et al. | 162/157.3 |
| 5,021,515 | A | * 6/1991 | Cochran et al. | 525/371 |
| 5,045,331 | A | * 9/1991 | Antoon, Jr. | 426/118 |
| 5,049,624 | A | * 9/1991 | Adams et al. | 525/371 |
| 5,064,698 | A | * 11/1991 | Courtright et al. | 428/35.4 |
| 5,085,878 | A | 2/1992 | Hatakeyama et al. | 426/107 |
| 5,096,724 | A | 3/1992 | Zenner et al. | 426/124 |
| 5,101,611 | A | 4/1992 | Biskup et al. | 53/433 |
| 5,103,618 | A | 4/1992 | Garwood | 53/433 |
| 5,108,649 | A | 4/1992 | Matsumoto et al. | 252/188.28 |
| 5,110,677 | A | 5/1992 | Barmore et al. | 428/379 |
| 5,112,674 | A | 5/1992 | German et al. | 428/216 |
| 5,115,624 | A | 5/1992 | Garwood | 53/427 |
| 5,116,660 | A | 5/1992 | Komatsu et al. | 428/192 |
| 5,120,349 | A | 6/1992 | Stewart et al. | 71/93 |
| 5,120,585 | A | 6/1992 | Sutter et al. | 428/34.2 |
| 5,124,164 | A | 6/1992 | Matsumoto et al. | 426/398 |
| 5,128,060 | A | 7/1992 | Ueno et al. | 252/184 |
| 5,129,512 | A | 7/1992 | Garwood | 206/213.1 |
| 5,132,151 | A | 7/1992 | Graney | 428/40 |
| 5,135,787 | A | 8/1992 | Bair | 428/36.1 |
| 5,139,702 | A | 8/1992 | Carter et al. | 252/392 |
| 5,143,763 | A | 9/1992 | Yamada et al. | 428/36.2 |
| 5,143,769 | A | 9/1992 | Moriya et al. | 428/76 |
| 5,145,950 | A | 9/1992 | Funaki et al. | 528/481 |
| 5,151,331 | A | 9/1992 | Beeson et al. | 428/475.5 |
| 5,153,038 | A | 10/1992 | Koyama et al. | 428/35.8 |
| 5,155,974 | A | 10/1992 | Garwood | 53/510 |
| 5,158,537 | A | 10/1992 | Haak et al. | 604/20 |
| 5,171,593 | A | 12/1992 | Doyle | 426/106 |
| 5,176,849 | A | 1/1993 | Hwa et al. | 252/392 |
| 5,176,930 | A | 1/1993 | Kannankeril et al. | 426/124 |
| 5,183,573 | A | 2/1993 | Kreh et al. | 210/697 |
| 5,183,574 | A | 2/1993 | Hwa et al. | 210/701 |
| 5,183,848 | A | 2/1993 | Samuel et al. | 525/57 |
| 5,186,991 | A | 2/1993 | Samuel et al. | 428/35.8 |
| 5,194,315 | A | 3/1993 | Itoh | 428/178 |
| 5,202,052 | A | 4/1993 | Zenner et al. | 252/188.28 |
| 5,204,289 | A | 4/1993 | Moh | 501/5 |
| 5,204,389 | A | 4/1993 | Hofeldt et al. | 524/72 |
| 5,207,943 | A | 5/1993 | Cullen et al. | |
| 5,211,875 | A | 5/1993 | Speer et al. | 252/188.28 |
| 5,223,146 | A | 6/1993 | Kreh | 210/698 |
| 5,226,531 | A | 7/1993 | Garwood | 206/213.1 |
| 5,226,735 | A | 7/1993 | Beliveau | 383/103 |
| 5,227,411 | A | 7/1993 | Hofeldt et al. | 523/100 |
| 5,236,617 | A | 8/1993 | Ueno et al. | |
| 5,239,016 | A | 8/1993 | Cochran et al. | 525/371 |
| 5,241,149 | A | 8/1993 | Watanabe et al. | 219/10.55 E |
| 5,242,111 | A | 9/1993 | Nakoneczny et al. | 239/47 |
| 5,244,600 | A | 9/1993 | Cuisia et al. | 252/396 |
| 5,247,746 | A | 9/1993 | Johnson et al. | 53/432 |
| 5,250,310 | A | 10/1993 | Fujino et al. | 426/124 |
| 5,254,354 | A | 10/1993 | Stewart | 426/106 |
| 5,258,537 | A | 11/1993 | Takeuchi et al. | 556/467 |
| 5,262,375 | A | 11/1993 | McKedy | |
| 5,270,337 | A | 12/1993 | Graf | 514/499 |
| 5,284,871 | A | 2/1994 | Graf | 514/499 |
| 5,286,407 | A | 2/1994 | Inoue et al. | 252/188.28 |
| 5,288,907 | A | 2/1994 | Sherwin et al. | 564/301 |
| 5,290,268 | A | 3/1994 | Oliver et al. | 604/359 |
| 5,296,291 | A | 3/1994 | Muller | 428/349 |

| | | | | | |
|---|---|---|---|---|---|
| 5,310,497 A | 5/1994 | Ve Speer et al. ........ 252/188.28 | 5,686,126 A | 11/1997 | Noel et al. .................. 426/127 |
| 5,320,598 A | 6/1994 | Haak et al. .................... 604/20 | 5,686,127 A | 11/1997 | Stockley, III et al. ....... 426/129 |
| 5,322,701 A | 6/1994 | Cullen et al. ............... 426/124 | 5,698,250 A | 12/1997 | DelDuca et al. ............ 426/124 |
| 5,323,590 A | 6/1994 | Garwood ..................... 53/433 | 5,700,554 A | 12/1997 | Speer et al. ................ 428/220 |
| 5,332,590 A | 7/1994 | McKedy ..................... 426/398 | 5,711,978 A | 1/1998 | Breen et al. ................ 426/129 |
| 5,334,405 A | 8/1994 | Gorlich ...................... 426/396 | 5,811,142 A | 9/1998 | DelDuca et al. ............ 426/424 |
| 5,346,312 A | 9/1994 | Mabry et al. ............... 383/113 | 5,928,560 A | 7/1999 | DelDuca et al. |
| 5,346,644 A | 9/1994 | Speer et al. ........... 252/188.28 | 5,948,457 A | 9/1999 | DelDuca et al. ............ 426/124 |
| 5,348,752 A | 9/1994 | Gorlich ...................... 426/129 | 6,054,153 A | 4/2000 | Carr et al. ..................... 426/87 |
| 5,350,622 A | 9/1994 | Speer et al. ................ 428/215 | 6,132,781 A | 10/2000 | Carr et al. .................. 426/124 |
| 5,362,531 A | 11/1994 | Samuel et al. ............. 428/36.6 | 6,183,790 B1 | 2/2001 | DelDuca et al. ............ 426/124 |
| 5,364,555 A | 11/1994 | Zenner et al. ......... 252/188.28 | 6,231,905 B1 | 5/2001 | DelDuca et al. ............ 426/118 |
| 5,364,669 A | 11/1994 | Sumida et al. ................. 428/1 | 6,315,921 B1 | 11/2001 | DelDuca et al. ....... 252/188.28 |
| 5,378,428 A | 1/1995 | Inoue et al. .................... 422/9 | 6,395,195 B1 | 5/2002 | Evans et al. ........... 252/188.28 |
| 5,390,475 A | 2/1995 | Iwauchi et al. ............... 53/474 | | | |
| 5,399,289 A | 3/1995 | Speer et al. ........... 252/188.28 | | | |
| 5,418,112 A | 5/1995 | Mirle et al. ................. 430/269 | | | |
| 5,422,366 A | 6/1995 | Mintzis et al. .............. 514/474 | | | |
| 5,425,896 A | 6/1995 | Speer et al. ........... 252/188.28 | | | |
| 5,430,098 A | 7/1995 | Samuel et al. ................ 525/57 | | | |
| 5,443,727 A | 8/1995 | Gagnon ....................... 210/490 | | | |
| 5,445,607 A | 8/1995 | Venkateshwaran et al. ... 604/20 | | | |
| 5,491,019 A | 2/1996 | Kuo ............................. 428/213 | | | |
| 5,492,705 A | 2/1996 | Porchia et al. .............. 426/106 | | | |
| 5,492,742 A | 2/1996 | Zenner et al. .............. 428/35.2 | | | |
| 5,498,364 A | 3/1996 | Speer et al. ........... 252/188.28 | | | |
| 5,510,166 A | 4/1996 | Inoue et al. ................... 428/76 | | | |
| 5,529,833 A | 6/1996 | Speer et al. ................ 428/215 | | | |
| 5,580,573 A | 12/1996 | Kydonieus et al. ......... 424/449 | | | |
| 5,585,129 A | 12/1996 | Geddes et al. .............. 429/394 | | | |
| 5,631,036 A | 5/1997 | Davis .......................... 426/396 | | | |
| 5,638,660 A | 6/1997 | Kuo ............................... 53/449 | | | |
| 5,639,815 A | 6/1997 | Cochran et al. ............ 524/413 | | | |
| 5,643,625 A | 7/1997 | Perry et al. ................. 426/395 | | | |
| 5,648,020 A | 7/1997 | Speer et al. ........... 252/188.28 | | | |
| 5,660,761 A | 8/1997 | Katsumoto et al. .... 252/188.28 | | | |
| 5,665,822 A | 9/1997 | Bitler et al. .............. 525/92 C | | | |
| 5,667,863 A | 9/1997 | Cullen et al. ................. 428/68 | | | |
| 5,672,406 A | 9/1997 | Challis et al. .............. 428/136 | | | |

OTHER PUBLICATIONS

T. Labuza and W. Breene, "Applications of 'Active Packaging' for Improvement of Shelf–Life and Nutritional. Qual.ity of Fresh and Extended Shelf–Life Foods", pp. 36–37 (1989).

*Principles of Modified Atmosphere of Modified Atmosphere Packaging of Foods* by R. T. Parry, Ed., "Meat Products" by P.N. Church, pp. 244–245 (1993).

*Active Food Packaging*, M. L. Rooney, Ed., "Interactive Packaging Involving Sachet Technology" by J. Smith et al. P. 143–152, pp. 82–85 (1995).

Leward, D.A., "Metmyoglobin Formatin in Beef Stored in Carbon Dioxide Enriched and Oxygen Depleted Atmospheres," Journal of Food Science vol. 35 pp. 33–37 (1970).

Gill, C. O., et al., "The Use of Oxygen Scavengers to Prevent Transcient Discolouriation of Ground Beef Packaged Under Controlled, Oxygen–depleted Atmospheres," Meat Science, vol. 41, No. 1, pp. 19–27, (1995).

Gill, C. O., "Extending the Storage Life of Raw Cholled Meats," Elsevier Science Ltd., S99–S109 (1990).

* cited by examiner

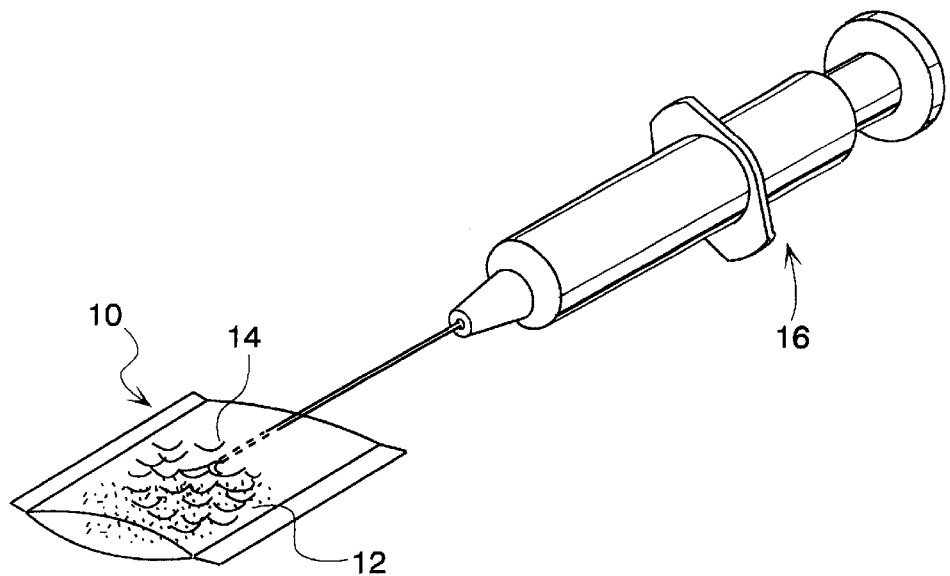
Fig. 1
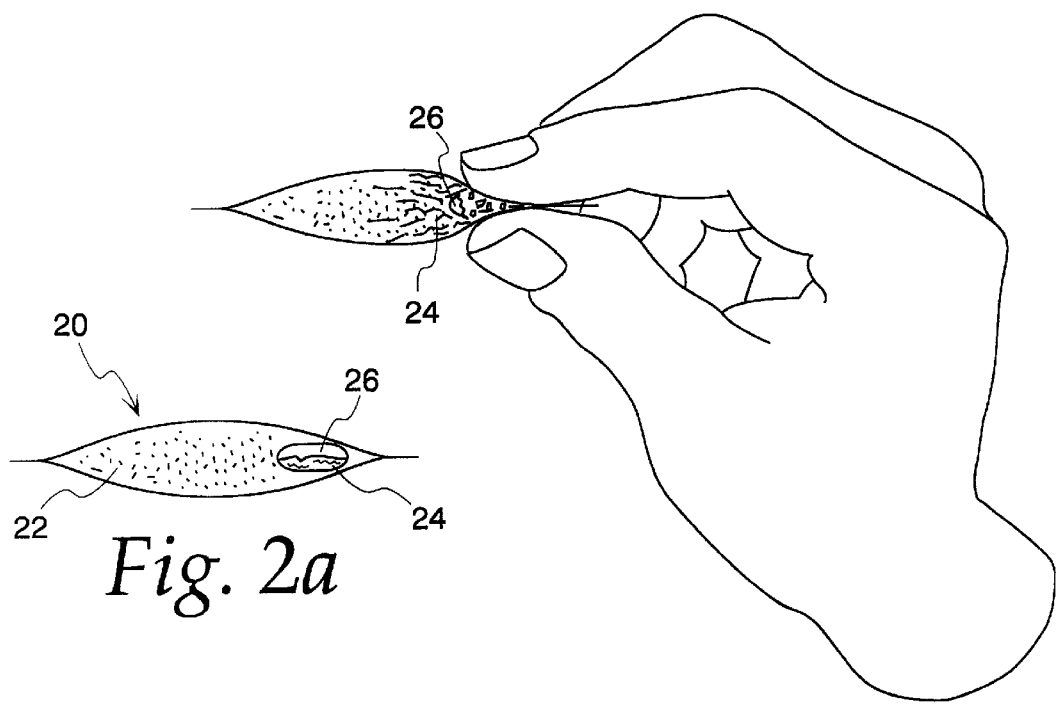
Fig. 2b
Fig. 2a

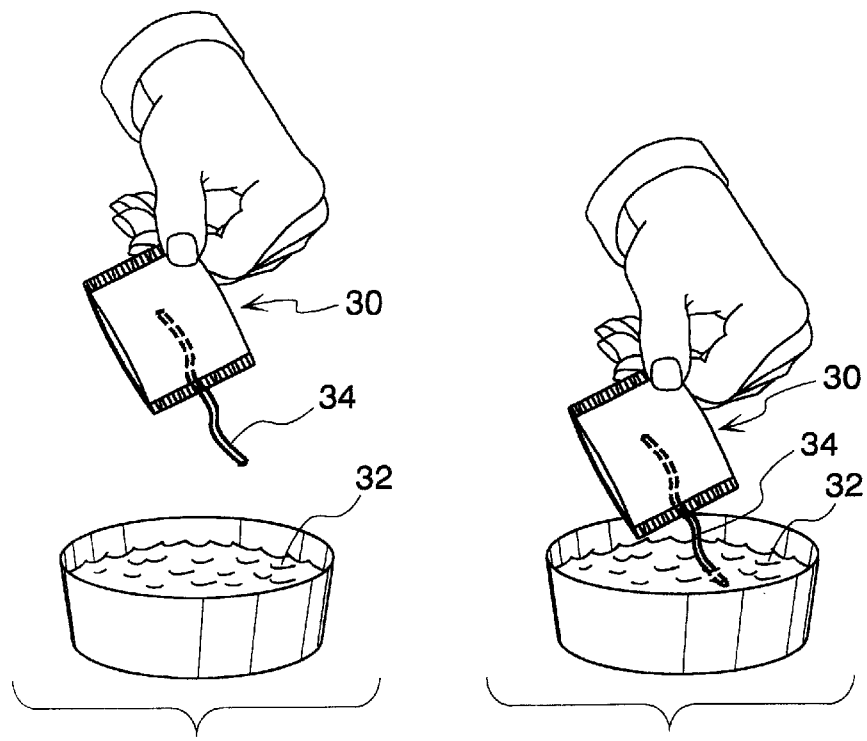
*Fig. 3a*  *Fig. 3b*
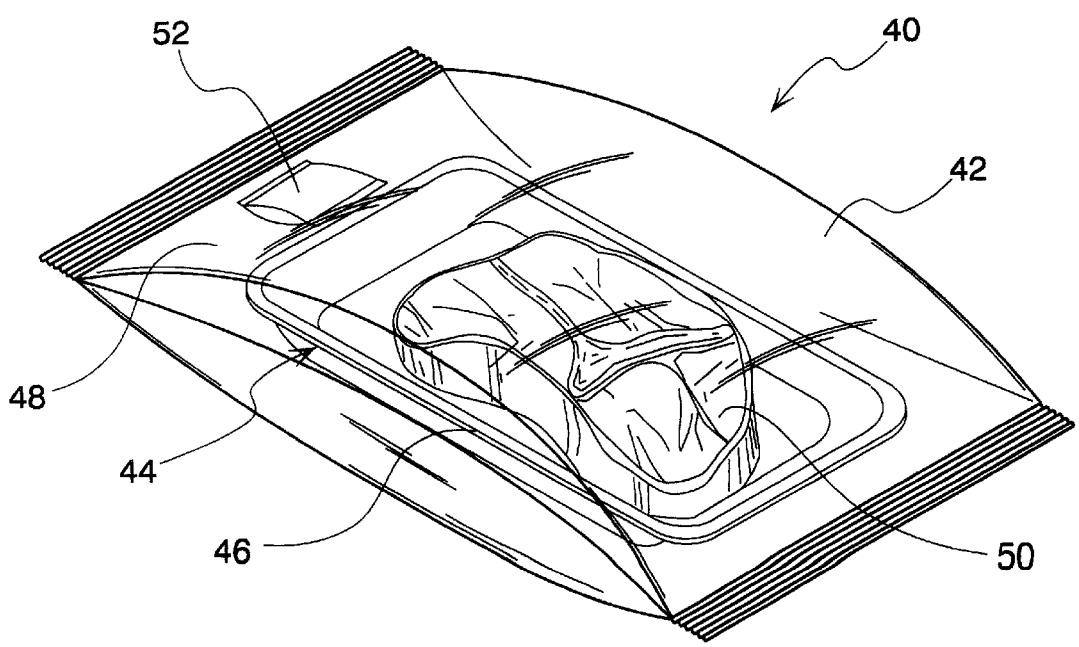
*Fig. 4*

OXYGEN SCAVENGER ACCELERATOR

RELATED APPLICATION

The present application claims priority to Provisional U.S. patent application Ser. No. 60/108,315, filed Nov. 13, 1998, which is a continuation-in-part of application Ser. No. 08/856,448 filed May 14, 1997, now U.S. Pat. No. 5,928,560, issued on Jul. 27, 1999, which is a continuation-in-part of U.S. patent application Ser. No. 08/700,644, filed Aug. 8, 1996, now abandoned.

FIELD OF THE INVENTION

The present invention relates generally to a device and method for maximizing the rate of oxygen uptake of an oxygen absorber. More particularly, the invention relates to an iron based oxygen scavenging packet having an improved composition for accelerating the rate of oxygen absorption wherein the packet is specifically designed to be used in a packaging system designed to keep meat fresh.

BACKGROUND OF THE INVENTION

Perishable foods, such as meats, fruits, and vegetables are typically placed into packaging systems after harvesting in order to preserve these foods for as long as possible. Maximizing the time in which the food remains preserved, especially the time between initial packaging at the plant and delivery at the retail grocery store, increases the profitability of all entities in the chain of distribution by minimizing the amount of spoilage.

The environment in which the food is preserved is a critical factor in the preservation process. Not only is maintaining an adequate temperature important, but the molecular and chemical content of the gases surrounding the food is important as well. By providing an appropriate gas content to the environment surrounding the food, the food can be better preserved when maintained at the proper temperature or even when it is exposed to variations in temperature. This gives the food producer some assurance that after the food leaves his or her control, the food will be in an acceptable condition when it reaches the retail grocery store and ultimately, the consumer.

In meat packaging, in particular, packaging systems which provide extremely low levels of oxygen are desirable because it is well known that the fresh quality of meat can be preserved longer under anaerobic conditions than under aerobic conditions. Maintaining low levels of oxygen minimizes the growth and multiplication of aerobic bacteria.

One way to insure a minimal level of oxygen in a meat package is to subject the package or rigid gas barrier materials to a vacuum in order to remove as much of the gas in the package as possible prior to sealing the package. The package can then be sealed and the meat maintained in a "zero" atmosphere environment (commonly referred to as vacuum packaging). Under vacuum packaging conditions, red meat turns purple. Consumers, however, prefer to see their meat bright red. As a result, vacuum packaging has not been well accepted for consumer cuts of meat.

Another means of insuring a minimal level of oxygen in a meat package is to seal the meat in a refill modified atmosphere packaging system. This kind of modified atmosphere packaging technology (MAP) is so successful that meat can be cut and packaged several weeks before purchase and still remain fresh. Such systems typically utilize multiple layers of packaging. The outside layer of packaging is generally a rigid container with good barrier properties. The inner layer of packaging is an oxygen permeable film. To provide a modified atmosphere environment, the air-evacuated package is typically filled with a mixture of gases consisting of about 30 percent carbon dioxide ($CO_2$) and 70 percent nitrogen (N2). Refilling the air-evacuated package with such a mixture of gases is believed to suppress the growth of anaerobic bacteria. The outer layer is peeled off just prior to presenting the consumer cut for sale at the supermarket. This allows the meat to rebloom to a bright red color. An excellent example of such an evacuation and refill MAP process is described in U.S. Pat. No. 5,115,624 to Garwood. Vacuum packaging and refill MAP is very expensive for three reasons. First, the rigid part of the package is expensive. Second, processing speeds are slow due to the vacuum and refill steps. And third, the equipment to do these procedures is very complicated and expensive.

Another less expensive means of insuring a minimal level of oxygen in a meat package is to use a gas flush MAP process. The complicated steps of evacuating the package and refilling with the desired gas mixture are eliminated. The outer bag (a barrier layer), is simply flushed with the proper gas mixture as it is formed around the inner container. The flush process reduces the oxygen content of the package to about two percent. An oxygen scavenger is placed in the package to absorb additional oxygen just prior to or simultaneously with forming and flushing the outer bag. An excellent example of such a MAP system is described in the patent application entitled "Modified Atmosphere Package" filed on Apr. 3, 1996, and given Ser. No. 08/627,137.

A critical feature of a gas flush MAP packaging system is the ability to keep meat looking fresh and palatable. Oxidized meat turns an undesirable brown color. Accordingly, as discussed, an oxygen scavenger is typically placed inside the meat package in order to absorb any residual oxygen within the package after gas flushing and sealing the package. It is critically important to quickly remove the oxygen from meat to prevent it from turning brown. Especially important in preventing the irreversible change from red to brown is the rate at which oxygen is scavenged. If oxygen is removed quickly, the packaged meat turns a purple red color. This purple red color quickly "blooms" to a bright red color upon removal of the outer layer of packaging.

Oxygen scavengers are increasingly being used in packaging systems in order to protect various products from the detrimental effects of oxygen exposure. Several oxygen scavengers utilize the oxidation of particulate iron as a method to absorb oxygen. A small amount of water is essential for this reaction. In some instances, a water attracting agent such as silica gel can be used to attract water and at times to supply water in the packet initially. A major drawback to this technology is, however, the limited amount of water that can be supplied. Typically, a major portion of the water needed for the oxidation of particulate iron is provided by the product and/or packaging environment being protected. This is oftentimes an inadequate amount to promote the efficient and expedient oxidation of iron. And as mentioned, the slower the rate of oxygen reduction, the more likely meat will turn irreversibly brown.

A need thus exists to accelerate the rate of oxygen scavengers, particularly in the confines of a modified atmosphere packaging system. Optimally, it would be desirable to lower the oxygen level to about 0.04 percent (400 PPM) within 90 minutes and to about zero within 24 hours. This need will be addressed by the present invention.

SUMMARY OF THE INVENTION

The present invention provides an iron-based oxygen scavenging packet which exhibits an increased rate of oxygen absorption especially in the confines of a concomitant meat packaging system. The invention specifically provides an oxygen scavenging packet that comprises an iron-based oxygen absorber and an oxygen uptake accelerator comprising water. The oxygen uptake accelerator accelerates the rate of oxygen uptake of the iron-based absorber. In a preferred embodiment, the invention provides an oxygen scavenging packet where a ratio of between 0.2 ml and 0.8 ml of oxygen uptake accelerator to about 2.5 grams of iron is present in the packet. Plain water makes an excellent accelerator, but the addition of an electrolyte, either dissolved in the water or added as a solid in the oxygen scavenger packet, will further increase the rate of oxygen uptake. Examples of electrolytes that may be used are acids such as acetic acid and citric acid and salts such as metal (e.g., copper) salts and NaCl, $CaCl_2$, and $MgCl_2$. Optimally, approximately 0.6 ml of oxygen uptake accelerator per 2.5 grams of iron is present in the packet.

BRIEF DESCRIPTION OF THE DRAWINGS

Other objects and advantages of the invention will become apparent upon reading the following detailed description and upon reference to the drawings in which:

FIG. 1 illustrates an oxygen scavenging packet in which the oxygen uptake accelerator is being introduced into the packet via a syringe.

FIGS. 2a and 2b, respectively, illustrate an oxygen scavenging packet containing a capsule which can be ruptured at an appropriate time to release the oxygen uptake accelerator and a packet containing a capsule being ruptured.

FIGS. 3a and 3b, respectively, illustrate an oxygen scavenging packet including a protruding wick for absorption of the oxygen uptake accelerator into the packet and an oxygen scavenging packet in which the wick is being dipped into the oxygen scavenger accelerator.

FIG. 4 is an isometric view of the oxygen scavenging packet of the instant invention inside a modified atmosphere packaging system.

Figure 5:
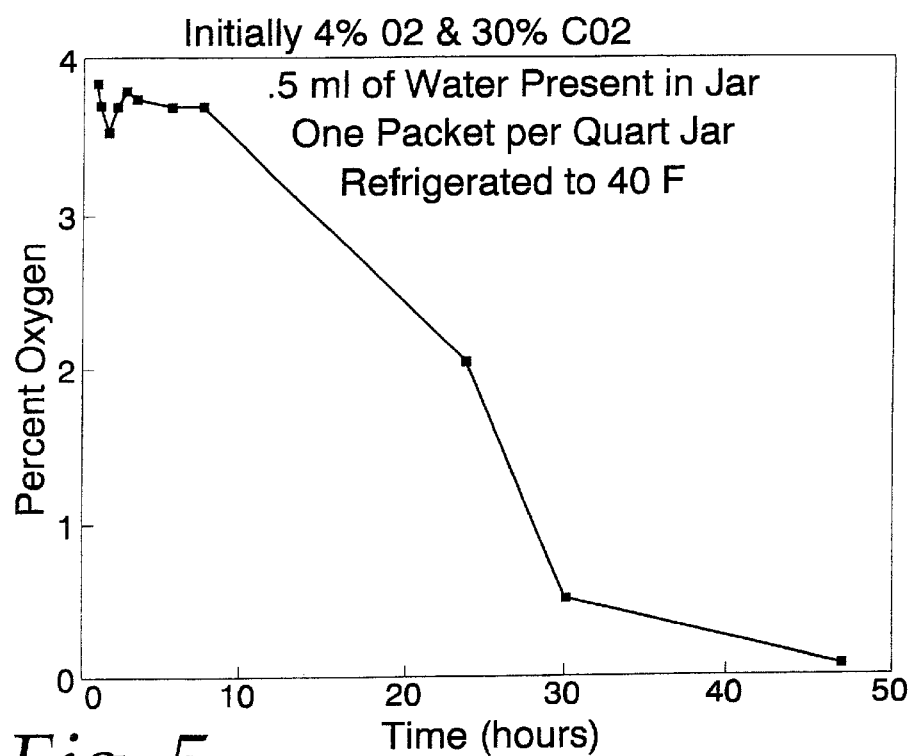
FIG. 5 is a graph illustrating the rate of oxygen absorption when a dry oxygen scavenging packet is introduced into a quart sized container which also includes 0.5 ml of water.

While the invention is susceptible to various modifications and alternative forms, certain specific embodiments thereof have been shown by way of example in the drawings and will be described in detail. It should be understood, however, that the intention is not to limit the invention to the particular forms described. On the contrary, the intention is to cover all modifications, equivalents, and alternatives falling within the spirit and scope of the invention as defined by the appended claims.

DETAILED DESCRIPTION OF THE PREFERRED EMBODIMENT

Turning now to the drawings, FIGS. 1 through 3(a and b) depict an oxygen scavenging packet having a liquid oxygen uptake accelerator present in some form within the packet.

Specifically, FIG. 1 depicts an oxygen scavenging packet 10 containing elemental iron 12 and in which an oxygen uptake accelerator 14 is introduced into the packet utilizing a syringe 16. Injection can be performed manually with a syringe and hand placement of the packet inside the package. Alternatively, the injection process can be automated by using a commercially available metering and dispensing pump such as the Luft Systematic model 45/50 and appropriate conveying equipment to position the packets for injection and then subsequently to place the packets into a package.

FIG. 2a depicts an oxygen scavenging packet 20 containing elemental iron 22 and in which an oxygen uptake accelerator 24 is present inside a capsule 26. As FIG. 2b shows, the capsule 26 may be ruptured by mechanical force at an appropriate time in order to release the oxygen uptake accelerator 24. Optimally, the capsule should be ruptured immediately prior to or immediately after the sealing of the package in order to properly activate the iron-based scavenger for accelerated oxygen uptake.

FIG. 3a depicts an iron-based oxygen scavenging packet 30 containing elemental iron (not specifically shown) and in which an oxygen uptake accelerator 32 can be introduced into the packet by absorption onto a wick 34 which protrudes from the packet. As FIG. 3b shows, the wick 34 dipped into the oxygen uptake accelerator 32. An appropriate amount of oxygen uptake accelerator 32 is absorbed through the wick 34 into the packet 30. Optimally, the dipping occurs immediately prior to the sealing of the package in order to properly activate the iron based scavenger for accelerated oxygen uptake.

Further information concerning the construction of the oxygen absorber packet preferred for use in the instant invention may be obtained from U.S. Pat. No. 5,262,375 to McKedy, entitled "Oxygen Absorber." The preferred oxygen absorber packets are manufactured by Multiform Desiccants Incorporated. However, other iron-based oxygen absorbers will work comparably well in the instant invention.

The instant invention particularly concerns an iron-based oxygen scavenging packet which contains an oxygen uptake accelerator consisting of water or an aqueous solution of some other substance dissolved in or mixed with water. The oxygen uptake accelerator accelerates the rate of oxygen uptake of the oxygen absorber. Water alone will activate and accelerate iron-based oxygen absorbers via the presence of hydronium ions in the water. However, solutions prepared with electrolytes, such as dilute acid solutions, are preferred oxygen uptake accelerators. The electrolyte may be present as part of the oxygen uptake accelerator or it may be added in a dry form as part of the oxygen absorbing packet.

Acids provide increased numbers of hydronium ions which increase the oxidation rate of iron by acting as electron accepters. These electron accepters facilitate the ionization of neutral iron. Once ionized, the iron readily reacts with the available oxygen and water to form a hydrated iron oxide. Other electron acceptors such as the positively charged ions making up salt solutions or metals such as copper also facilitate the ionization of neutral iron.

The preferred aqueous solution of the instant invention is an aqueous solution which contains approximately five percent acetic acid.

The introduction of the oxygen uptake accelerator (comprising water or an aqueous solution of an electrolyte) into the oxygen absorber packet (comprising iron-based oxygen absorber, and optionally dry electrolytes) serves to activate and dramatically increase the rate of oxygen uptake of the iron inside the packet. The particulate iron in the packet, in effect, turns to rust as oxygen is absorbed from the atmosphere surrounding the packaged meat or other packaged food product. As discussed, the water or aqueous solution enhances oxygen absorption by the iron by acting as an electron acceptor. A proposed mechanism for rust formation is as follows:

$$Fe(s) \rightarrow Fe^{2+} + 2e^- \quad (1)$$

$$e^- + H_3O^+ \rightarrow H_2O \quad (2)$$

$$4H + O_2 \rightarrow 2H_2O \quad (3)$$

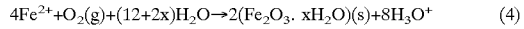

$$4Fe^{2+} + O_2(g) + (12+2x)H_2O \rightarrow 2(Fe_2O_3 \cdot xH_2O)(s) + 8H_3O^+ \quad (4)$$

In step (1) ferrous ions are produced by loss of electrons from the elemental particulate iron in the packet. However, this process cannot go very far unless there is some way to get rid of the electrons which accumulate on the residual Fe. One way to do this is by step (2) in which $H_3O^+$ ions either from the water or from acid substances in the water, pick up the electrons to form neutral H atoms. Since Fe is known to be a good catalyst for hydrogenation reactions in general, it is believed that step (3) now occurs to use up the H atoms. In the meantime, the ferrous ion reacts with $O_2$ gas by step (4) to form the rust and restore $H_3O_+$ required for step (2). The net reaction, obtained by adding all four steps is

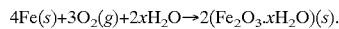

$$4Fe(s) + 3O_2(g) + 2xH_2O \rightarrow 2(Fe_2O_3 \cdot xH_2O)(s).$$

Acid accelerates the reaction by providing excess hydronium ions ($H_3O^+$) and driving step 2. Therefore, the preferred embodiment of the present invention utilizes a dilute aqueous solution of acid. Such acid solutions should, of course, be compatible with food products and include, for instance, acetic acid and/or citric acid.

Salt solutions also drive step (2) of the aforementioned reaction by providing an electron acceptor, thus they are suitable for use in the aqueous solution of the instant invention. Additionally, it has been found that adding copper to water and/or dilute aqueous solution of acid speeds the rate of oxygen absorption by the iron. It is believed that the copper induces a phenomena called electrolytic corrosion. Electrons flow from the iron to the copper, where their energy is lower. This removes the excess negative charge from the iron. In addition H atoms, which now form on the negative copper surface instead of the iron, detach themselves more readily from copper than from iron, thus accelerating step (3) of the aforementioned reaction.

As shown in FIGS. 1–3(a and b), the aqueous solution can be introduced into the packet utilizing an injection type process. Alternatively, the solution can be included in the absorber packet in a separate capsule or compartment which can be ruptured at the time of sealing the meat package. Also, a wick could be included in, and protrude from, the packet such that the wick could be dipped in liquid just prior to sealing the meat package.

A preferred embodiment of the present invention involves the injection of an oxygen uptake accelerator comprising water into the MRM absorbers manufactured by Multiform Desiccants Incorporated. This is done just prior to the placement of the absorber into a package. This can be done manually with a syringe and hand placement or the process can be automated by using a commercially available metering and dispensing pump such as the Luft Systematic model 45/50 and appropriate conveying equipment to position the packets for injection and then subsequently to place the packets into a package.

The following data, depicted in FIGS. 5–13 and in Table 1 is specific to Multiform's MRM 100 scavenger packets. All of these experiments involve using these scavengers. The MRM 100 oxygen scavengers are specifically formulated to work in the presence of $CO_2$ and refrigeration. MRM 100 oxygen scavengers contain approximately 2.5 grams of iron and silica gel impregnated with a carbon dioxide generator, $NaHCO_3$. A carbon dioxide generator is utilized to replace gas volume in the sealed meat package as $O_2$ is absorbed. The iron in MRM absorbers is electrolytically reduced and annealed which means that the iron is reduced by the passage of electric current through a solution of the iron which is in the form of a molten salt. As one skilled in the art will appreciate, while MRM 100 scavenger packets were used in the following described experiments, similarly constituted scavenger packets would be expected to have comparably enhanced oxygen scavenging activities with the addition of water and other accelerators.

Figure 6:
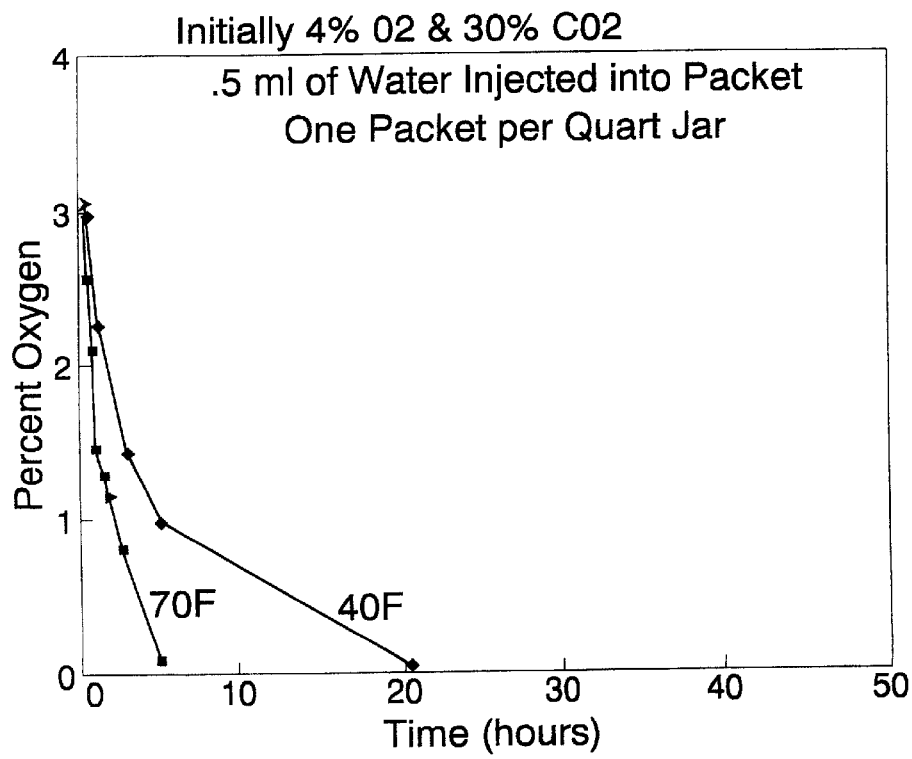
FIG. 6 is a graph illustrating the rate of oxygen absorption when an oxygen scavenging packet having 0.5 ml of water injected into the packet is introduced into a quart sized container.

FIGS. 5 and 6 illustrate that the oxygen uptake accelerator, in this case water, must be contained within the oxygen scavenging packet in order to increase the rate of oxygen absorption. Specifically, FIG. 5 shows the decrease in percent oxygen as a function of time when 0.5 ml of water is merely present in a quart-sized jar along with an oxygen scavenging packet. As shown in FIG. 5, at 40° F. it takes approximately 30 hours for the percent oxygen to be reduced to approximately 0.5% (5,000 PPM) and more than 40 hours for the percent oxygen to be reduced to near 0.0% oxygen. By contrast, FIG. 6 shows the decrease in percent oxygen as a function of time when 0.5 ml of water is injected into an oxygen scavenging packet which is then placed in a quart-sized jar. At 40° F., it takes approximately 15 hours for the percent oxygen to be reduced to approximately 0.5% and about 20 hours for the percent oxygen to be reduced to near 0.0% oxygen. At 70° F., oxygen is scavenged much more quickly.

Figure 7:
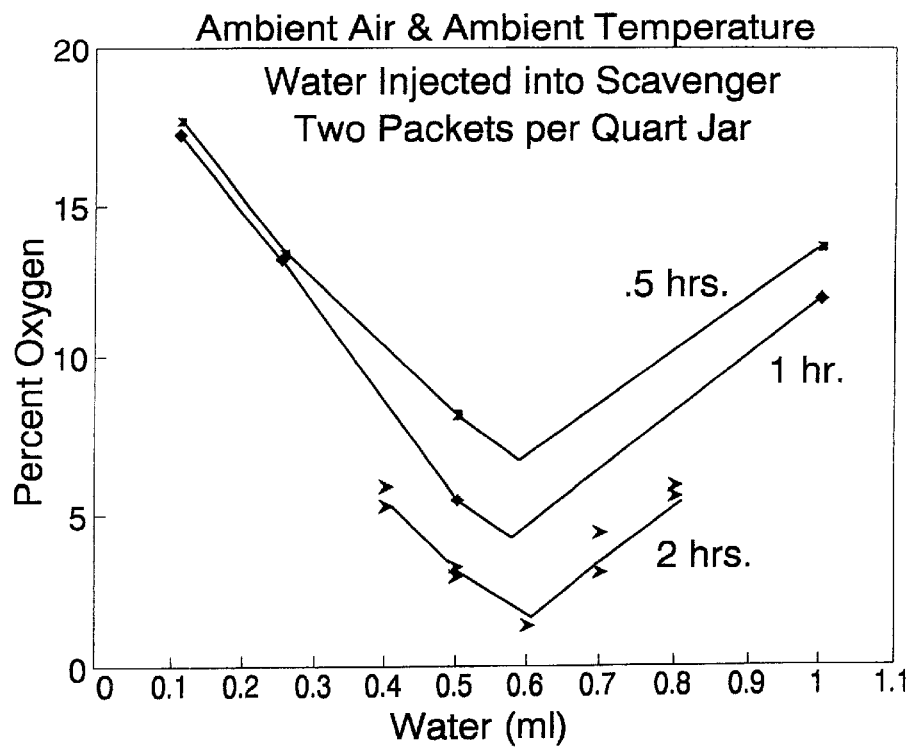
FIG. 7 is a graph illustrating the rate of oxygen absorption as a function of the amount of water injected into oxygen scavenging packets.

FIG. 7 shows that the oxygen scavenging rate is maximized when 0.6 ml of water is present in the oxygen scavenging packet.

Figure 8:
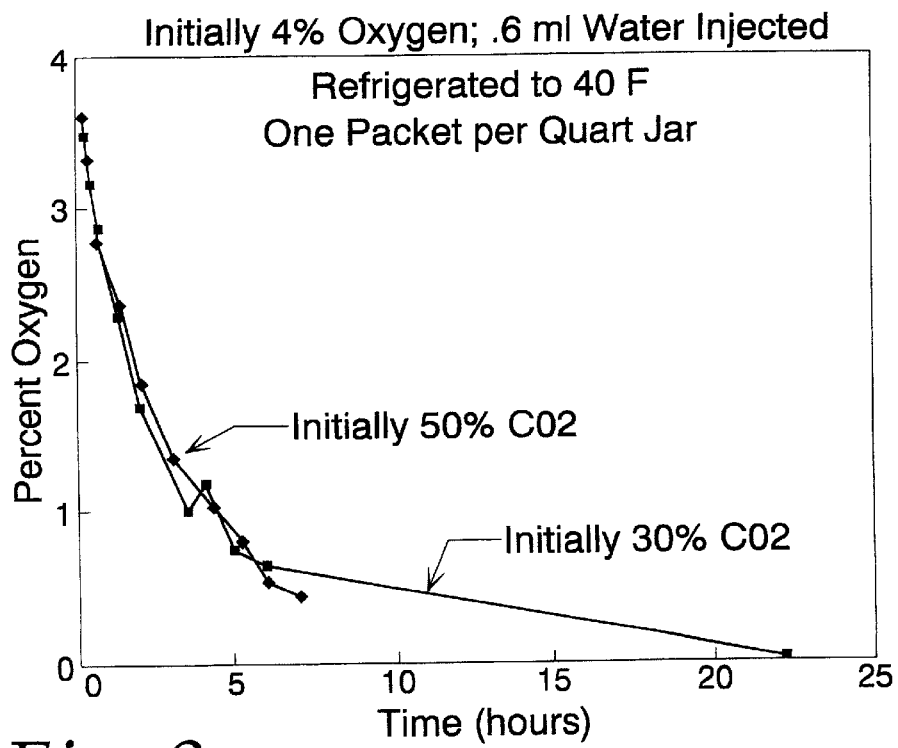
FIG. 8 illustrates the rate of oxygen absorption in the presence of varying amounts of $CO_2$ utilizing an oxygen scavenging packet which has been injected with 0.6 ml of water.

FIG. 8 shows that oxygen absorption appears to be independent of the amount of carbon dioxide in the container.

Figure 9:
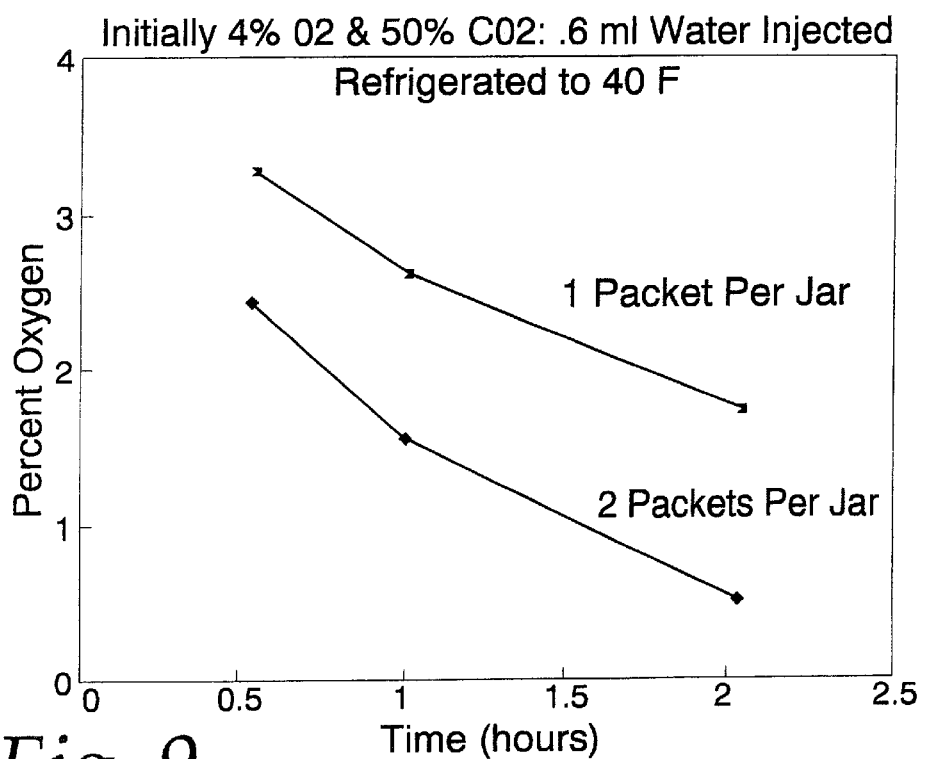
FIG. 9 is a graph illustrating the rate of oxygen absorption as a function of the number of oxygen scavenging packets introduced into a one quart jar.

FIG. 9 shows that two oxygen scavenging packets absorb oxygen at nearly twice the rate of one packet.

Figure 10:
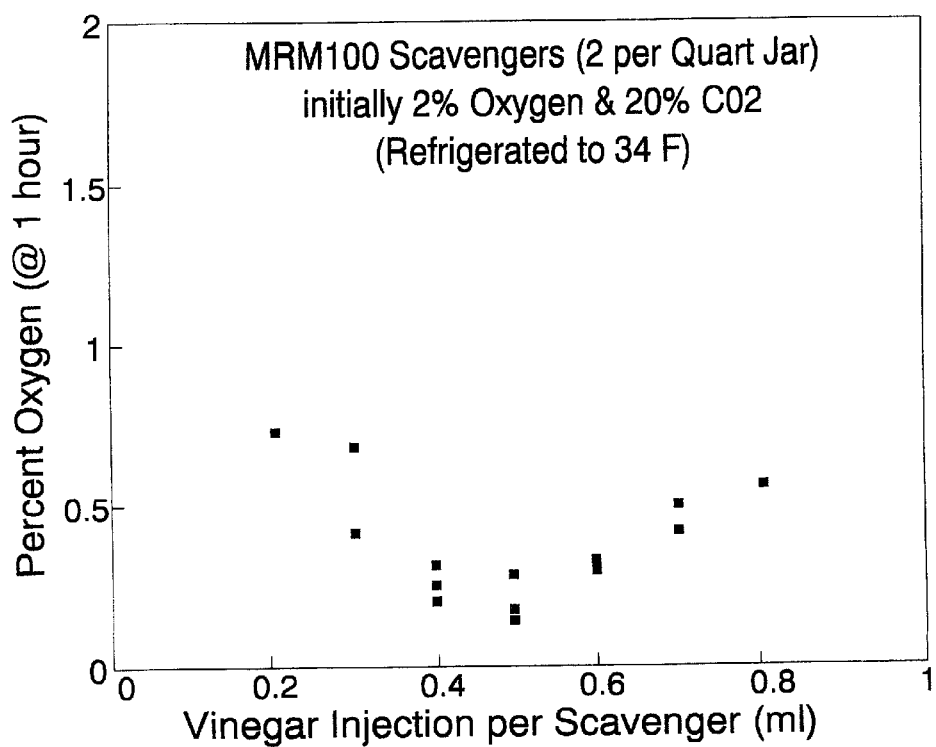
FIG. 10 is a graph showing the percent oxygen after 1 hour as a function of the amount of acetic acid (vinegar) injected into each of two oxygen scavenging packets.
Figure 11:
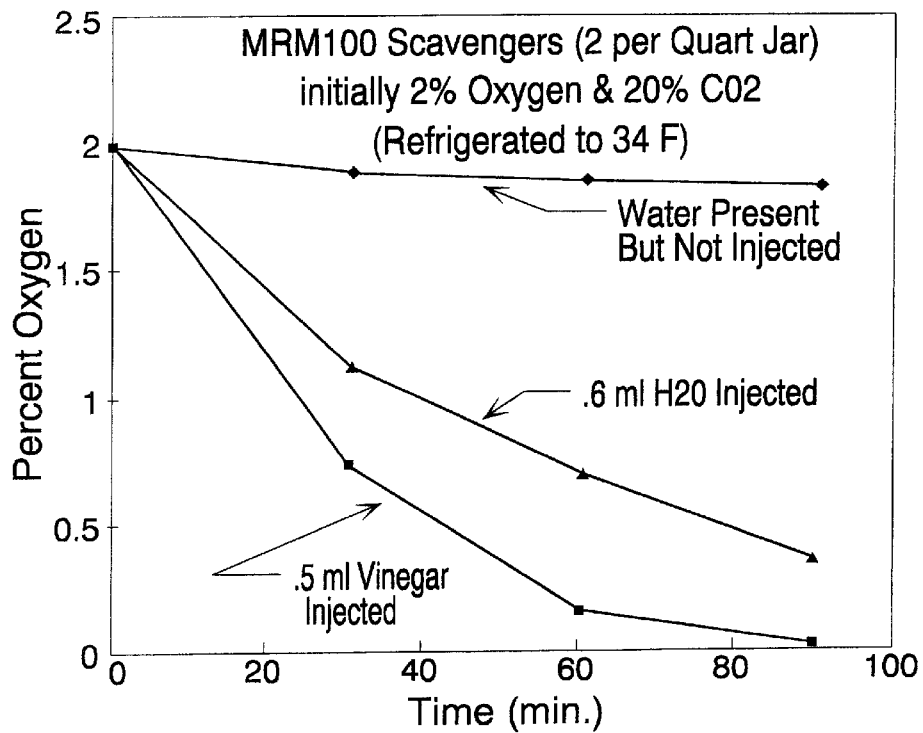
FIG. 11 is a graph showing the percent oxygen as a function of time and as a function of the material injected into the oxygen scavenging packets.

As shown in FIG. 10, acetic acid, commonly known as vinegar acid, works particularly well in accelerating the rate of oxygen absorption of an MRM oxygen scavenger packet. Specifically, the injection of 0.5 ml. of acetic acid into each of two absorber packets reduces the amount of oxygen in a quart jar to approximately 0.1% $O_2$ (1000 PPM) in one hour. As shown in FIG. 11, the percent $O_2$ is reduced to approximately 0.04% $O_2$ (400 PPM) in about ninety minutes when 0.5 ml. of acetic acid is injected into each of two MRM 100 scavenger packets. Two conclusions can be drawn from the data in FIGS. 10 and 11. First, injected acetic acid seems to work better than plain water in increasing the rate of oxygen absorption of an absorber packet. Second, from FIG. 10, 0.5 ml. acetic acid appears to work particularly well in increasing the rate and total amount of oxygen absorption. In the experiments resulting in the data in FIGS. 10 and 11, the starting level of oxygen in the jars was 2.0%, simulating the amount of oxygen which would be present after the gas flush step of a gas flush MAP process. Also, the experiments were performed under refrigeration.

Below is a table which shows the results of an experiment designed to determine the range of amounts of water needed to be introduced into an oxygen scavenging packet containing approximately 2.5 grams of iron in order to satisfactorily activate the packets in a gas flush MAP packaging process for red meat.

TABLE 1

| Sample No. | Water Injection | Initial Oxygen | Final Oxygen | Color Rating - 1.5 hrs. Of Bloom (Day 8) | Color Rating - 24 hrs. Of Bloom (Day 9) |
|---|---|---|---|---|---|
| 1 | .8 ml | 1.9% | 0.00% | Dark Red | Some Browning |
| 2 | .6 ml | 1.24% | 0.00% | Dark Red | Bright Red |
| 3 | 1.0 ml | 2.30% | 0.26% | Major Browning | Major Browning |
| 4 | .4 ml | 2.20% | 0.00% | Dark Red | Bright Red |
| 5 | .2 ml | 1.70% | 0.00% | Dark Red | Dark Red |
| 6 | .4 ml | 1.50% | 14.9% | Excluded (Leaked) | Excluded |
| 7 | .8 ml | 1.70% | 0.00% | Dark Red | Dark Red |
| 8 | .6 ml | 1.55% | 0.00% | Dark Red | Bright Red |
| 9 | 1.0 ml | 2.20% | 0.00% | Dark Red | Some Browning |
| 10 | .2 ml | 2.40% | 0.00% | Major Browning | Major Browning |

The results show that water injections greater than 0.2 ml but less than 0.8 ml per 2.5 grams of iron (approximately 100 cc of absorber capacity) are required. For adequate oxygen scavenging, water injections must be within this range, preferably at 0.6 milliliters. Water injections outside of this range will result in a high risk of metmyoglobin formation (browning) due to initial oxygen exposure. This experiment was performed utilizing Multiform's MRM oxygen scavengers but other similar iron-based absorbers are believed to work comparably.

EXAMPLE 1

Determination of Range of Water Volume Necessary for Optimal Oxygen Scavenging of an Iron Based Oxygen Scavenging Packet A ten pound chunk of fresh boneless beef (five days post mortem) was cut into ten pieces and individually placed on meat trays or a soaker pad. The meat trays had one and one half inch tall side walls. The meat and trays were then stretch wrapped with a standard PVC film on a Hobart machine. After wrapping, a half inch diameter hole was created through the PVC in one corner of the tray to allow free flow of gases in and out of this "inner package." Next, two MRM 100 scavengers were injected with a precisely measured amount of water and attached to one of the inner packages containing the beef. The water injections were varied from 0.2 to 1.0 mils per scavenger. The inner package, with the oxygen absorbers attached, was then immediately run through a Fuji/Foremost form fill and seal machine and packaged in a flushed outer bag made from Print Pack 861D 2.5 mil barrier film. The flush gas was approximately 80% nitrogen and 20% carbon dioxide. The initial $O_2$ level in the barrier bag was measured through a rubber septum with a Dansensor oxygen analyzer and recorded. The completed packages were then placed in a refrigerator and stored at 34° F. for eight days. On the eight day the final oxygen level was measured and the barrier bag and oxygen absorbers removed. The meat was allowed to rebloom in the inner package for one and a half hours in the refrigerator. At that time the packages were removed from the refrigerator and the meat visually rated for color acceptability. The packages were then returned to the refrigerator for another 24 hours after which the meat was again rated for color acceptability.

The tray that was used for the experiment detailed in Example 1 and the data detailed in Table 1 left a significant amount of air space surrounding the meat, necessitating the use of two MRM 100 scavengers. However, beef has been successfully packaged on shallow wall meat trays using only one MRM 100 scavenger with a 0.5 ml injection of acetic acid.

Figure 12:
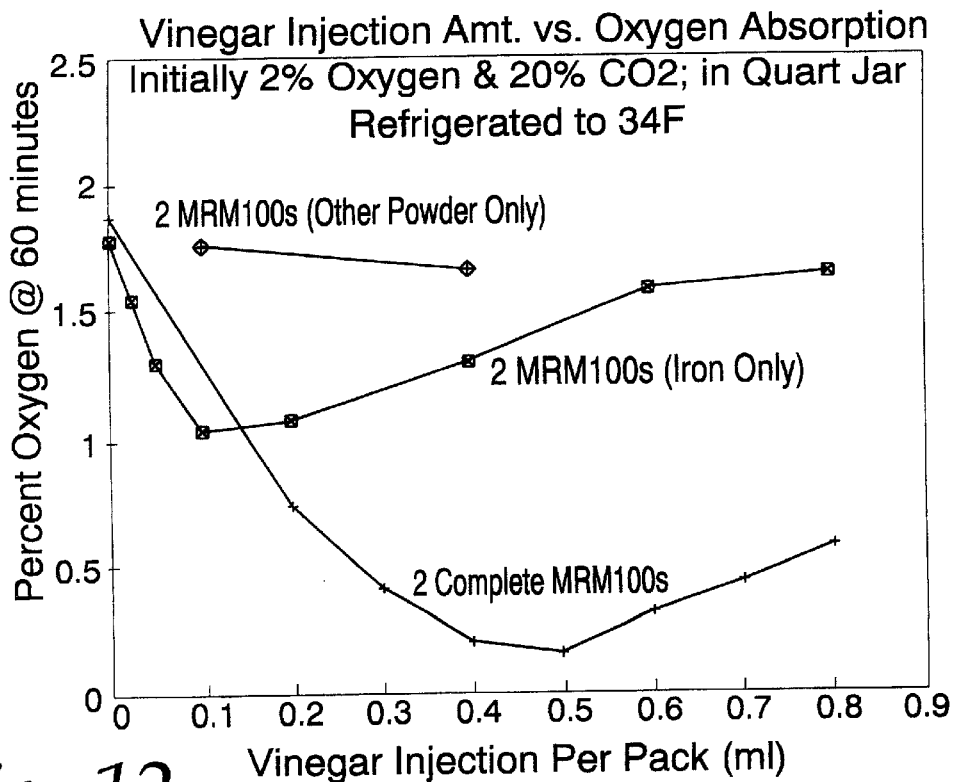
FIG. 12 is a graph illustrating the rate of oxygen absorption as a function of the amount of acetic acid injected into an iron containing packet and further as a function of whether or not the packet contains impregnated silica gel.

FIG. 12 shows that maximum oxygen absorption occurs at an amount of vinegar between about 0.4 and 0.6 ml acetic acid. FIG. 12 also illustrates that maximum oxygen absorption occurs when the oxygen scavenging packet contains silica gel impregnated with $NaHCO_3$ in addition to iron. MRM-100 absorbers and other similarly formulated absorbers employ silica gel to absorb and release atmospheric $H_2O$. As discussed previously, silica gel will not by itself absorb enough water to satisfactorily accelerate the oxygen scavenging ability of the iron to allow for the preservation of meats for longer than a few days at a time. For this reason, the present inventors have affirmatively added concrete amounts of water to the oxygen scavenging packets of the instant invention.

Figure 13:
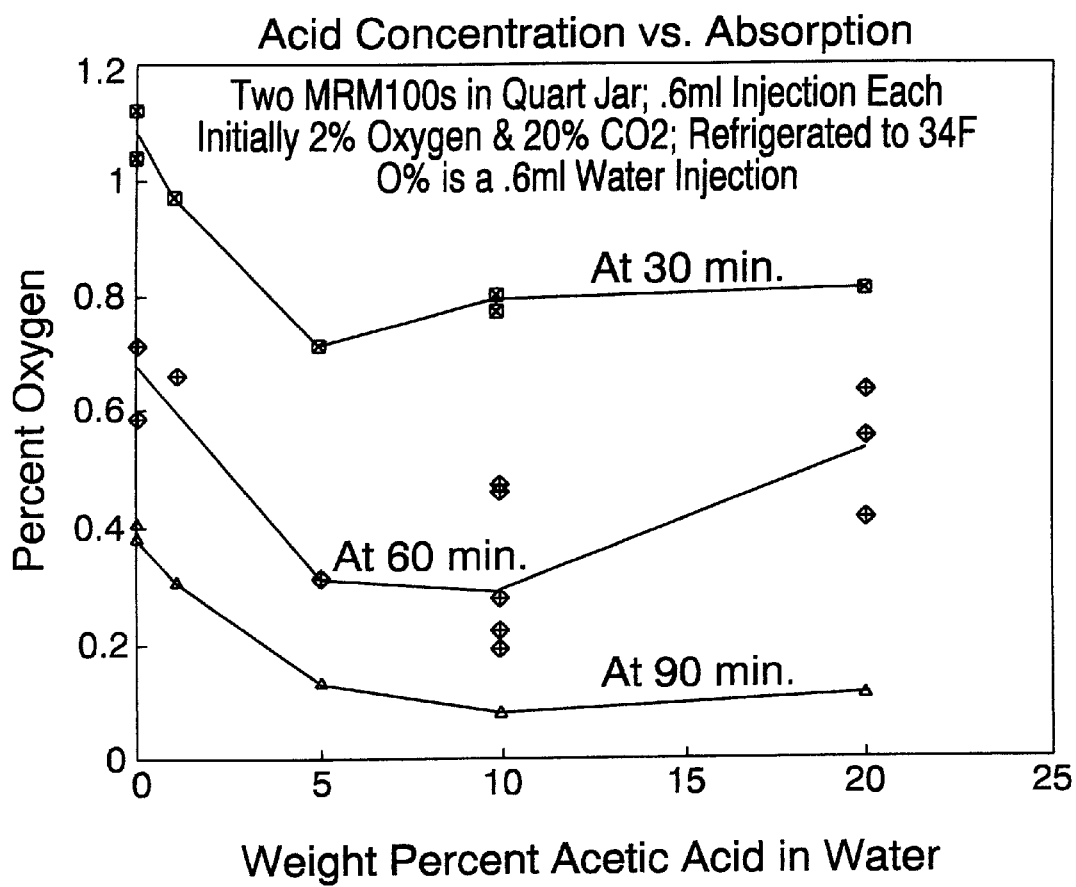
FIG. 13 is a graph illustrating the rate of oxygen absorption as a function of time and the concentration of acetic acid in water.

FIG. 13 shows the rate of oxygen absorption as a function of time and the concentration of acetic acid in water. As can be seen, 5% acetic acid performs very well at accelerating the rate of oxygen absorption at 30, 60 and 90 minutes. Furthermore, 5% acetic acid is very easy to obtain, being common table vinegar.

The present invention is particularly useful when used in a modified atmosphere packaging (MAP) process for fresh meats. The MAP process is a gas flush process that initially flushes the package to an oxygen atmosphere of about two percent or less. The oxygen scavenging packet of the instant invention is utilized to additionally reduce the oxygen level of the package to 400 PPM (0.04%) or less within ninety minutes.

A brief description of the typical modified atmosphere package will follow. This description is not meant to be limiting, but instead is provided merely to elucidate one particular use for the instant invention.

FIG. 4 depicts a modified atmosphere package 40 including an outer container 42 and an inner container 44. The inner container 44 includes a conventional semi-rigid plastic tray 46 thermoformed from a sheet of polymeric material which is substantially permeable to oxygen. Exemplary polymers which may be used to form the non-barrier tray 46 include polystyrene foam, cellulose pulp, polyethylene, polypropylene, etc. In a preferred embodiment, the polymeric sheet used to form the tray 46 is substantially composed of polystyrene foam and has a thickness ranging from about 100 mils to about 300 mils. The use of a common polystyrene foam tray 46 is desirable because it has a high consumer acceptance. The inner container 44 further includes a stretch film wrapping or cover 48 substantially composed of a polymeric material, such as polyvinyl chloride (PVC), which is substantially permeable to oxygen. In a preferred embodiment, the stretch film used to form the cover 48 contains additives which allow the film to cling to itself and has a thickness ranging from about 0.5 mil to about 1.5 mils. One preferred stretch film is Resinite™ meat film commercially available from Borden Packaging and Industrial Products of North Andover, Mass.

A food item such as a retail cut of raw meat 50 is located inside the inner container 44. Prior to fully wrapping the tray 46 with the cover 48, the partially formed inner container 44 may be flushed with an appropriate mixture of gases, typically a mixture of about 30 percent carbon dioxide and about 70 percent nitrogen, to lower the oxygen level in the inner container 44 to about 1.5 to 5.0 percent. The foregoing mixture of gases displaces the oxygen within the inner container 44 during the flushing operation. After flushing the inner container 44, the tray 46 is manually or automatically wrapped with the cover 48. The cover 48 is wrapped over the retail cut of raw meat 50 and about the bottom of the tray 46. The free ends of the cover 48 are overlapped along the underside of the bottom wall of the tray 46, and, due to the cling characteristic inherent in the cover 48, these overlapping free ends cling to one another to hold the cover 48 in place. If desired, the overwrapped tray 46, i.e., the inner container 44, may be run over a hot plate to thermally fuse the free ends of the cover 48 to one another and thereby prevent these free ends from potentially unraveling.

The outer container 42 is preferably a flexible polymeric bag composed of a single or multilayer plastics material which is substantially impermeable to oxygen. The outer container 42 may, for example, include an oriented polypropylene (OPP) core coated with an oxygen barrier coating such as polyvinylidene chloride and further laminated with a layer of sealant material such as polyethylene to facilitate heat sealing. In a preferred embodiment, the outer container 42 is composed of a multilayer barrier film commercially available as product no. 325C44-0EX861D from PrintPack, Inc. of Atlanta, Ga. The co-extruded film has a thickness ranging from about 2 mils to about 6 mils. Prior to sealing the peripheral edges of the outer container 42, the inner container 44 is placed within the outer container 42. Also, the outer container 42 is flushed with an appropriate mixture of gases, typically about 30 percent carbon dioxide and about 70 percent nitrogen, to lower the oxygen level in the outer container 42 to about 0.05 to 5.0 percent or 500 to 50,000 parts per million (PPM). Prior to or simultaneously with flushing the outer container 42, but still prior to sealing the outer container 42, the oxygen scavenging packet 52 is placed in the outer container 42 external to the sealed inner container 44. The outer container 42 is then sealed.

After a time period of about ninety minutes, the oxygen scavenging packet 52 lowers the oxygen level in the bag from its initial level of oxygen to less than about 0.04 percent or 400 PPM and most preferably to about zero percent. The oxygen uptake accelerator contained within the oxygen scavenging packet 52 is responsible for this fast rate of oxygen absorption. The oxygen scavenger 52 also absorbs any oxygen which might permeate into the outer container 42 from the ambient environment. In FIGS. 1 through 4, the oxygen scavenger 10, 20, 30, and 52 respectively, is illustrated as a packet or label which is inserted into the outer container 42 prior to sealing the outer container 42. Alternatively, an oxygen scavenging material may be added to the polymer or polymers used to form the outer container 42 so that the oxygen scavenging material is integrated into the outer container 42 itself.

The retail cut of raw meat 50 within the package 40 takes on a purple-red color when the oxygen is removed from the interior of the package 40. The meat-filled modified atmosphere package 40 may now be stored in a refrigeration unit for several weeks prior to being offered for sale at a grocery store. A short time (e.g., less than one hour) prior to being displayed at the grocery store, the inner container 44 is removed from the outer container 42 to allow oxygen from the ambient environment to permeate the non-barrier tray 46 and non-barrier cover 48. The purple-red color of the raw meat 50 quickly changes or "blooms" to a generally acceptable bright red color when the raw meat 50 is oxygenated by exposure to air.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. An oxygen scavenging packet for use in a modified atmosphere package, comprising:
    (a) a plurality of side walls defining an enclosed space;
    (b) an oxygen absorber within the enclosed space, said oxygen absorber comprising iron, silica gel, a carbon dioxide generator, and an electrolyte; and
    (c) a liquid oxygen uptake accelerator located within a separate compartment within the enclosed space, said oxygen uptake accelerator comprising water,
        wherein said separate compartment within the enclosed space is capable of being ruptured; wherein the contents of said separate compartment consist essentially of the liquid oxygen uptake accelerator;
        said liquid oxygen uptake accelerator which is present in said packet in an amount in the range of from about 0.2 ml to about 0.8 ml for each approximately 2.5 grams of iron wherein a packet containing approximately 5 grams of iron is capable of reducing the oxygen concentration in a quart-sized modified atmosphere package consisting essentially of air having about 2% oxygen and about 20% carbon dioxide to less than about 0.5% oxygen in about 90 minutes at about 34° F. immediately after the oxygen absorber comes into contact with the oxygen uptake accelerator.

2. The oxygen scavenging packet of claim 1, wherein said oxygen uptake accelerator is present in said packet in an amount between about 0.3 ml and about 0.7 ml per approximately 2.5 grams of said iron.

3. The oxygen scavenging packet of claim 1 wherein said iron is electrolytically annealed and reduced.

4. The oxygen scavenging packet of claim 1, wherein said oxygen uptake accelerator is contained within a frangible capsule and the oxygen uptake accelerator is introduced directly onto the oxygen absorber by rupturing the frangible capsule.

5. The oxygen scavenging packet of claim 1, wherein said oxygen uptake accelerator is contained within a bibulous wick, wherein said wick extends from the exterior of said packet, through at least one of said plurality of walls and into said enclosed space.

6. The oxygen scavenging packet of claim 1, wherein said silica gel is impregnated with the carbon dioxide generator.

7. The oxygen scavenging packet of claim 1, wherein approximately 0.4 to about 0.6 ml of said oxygen uptake accelerator is present in said packet per approximately 2.5 grams of said iron.

8. The oxygen scavenging packet of claim 7, wherein approximately 0.6 ml of said oxygen uptake accelerator is present in said packet per approximately 2.5 grams of said iron.

9. The oxygen scavenging packet of claim 1, wherein said electrolyte is chosen from the group consisting of acids and salts.

10. The oxygen scavenging packet of claim 9, wherein said acid is acetic acid or citric acid.

11. The oxygen scavenging packet of claim 9, wherein said salt is selected from the group consisting of NaCl, $CaCl_2$, and $MgCl_2$.

12. The oxygen scavenging packet of claim 9, wherein said salt is a metal salt.

13. The oxygen scavenging packet of claim 12, wherein said salt is a copper salt.

* * * * *